US007947233B2

(12) United States Patent  
Burd et al.

(10) Patent No.: US 7,947,233 B2  
(45) Date of Patent: May 24, 2011

(54) METHOD OF CATALYTIC REACTION

(75) Inventors: Steven W. Burd, Cheshire, CT (US); Meredith B. Colket, III, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/761,537

(22) Filed: Apr. 16, 2010

(65) Prior Publication Data

US 2010/0223849 A1 Sep. 9, 2010

Related U.S. Application Data

(62) Division of application No. 11/401,075, filed on Apr. 10, 2006, now Pat. No. 7,727,495.

(51) Int. Cl.
*B01J 8/06* (2006.01)
*B01J 8/00* (2006.01)
*B01J 8/02* (2006.01)
*B01J 8/04* (2006.01)
*B01J 10/00* (2006.01)
*B01J 35/02* (2006.01)
*B01J 19/30* (2006.01)

(52) U.S. Cl. ........ 422/312; 422/211; 422/600; 422/630; 422/631; 422/641

(58) Field of Classification Search ............ 422/197, 422/211, 312, 600, 630, 631, 641; 48/197 R; 423/376; 60/740

See application file for complete search history.

(56) References Cited

U.S. PATENT DOCUMENTS

| 4,185,459 | A | 1/1980 | Holste |
| 4,534,165 | A * | 8/1985 | Davis et al. ............. 60/778 |
| 4,929,798 | A | 5/1990 | de Lasa |
| 5,235,804 | A | 8/1993 | Colket, III et al. |
| 5,512,250 | A | 4/1996 | Betta et al. |
| 5,520,890 | A | 5/1996 | Lorentzen et al. |
| 6,174,159 | B1 | 1/2001 | Smith et al. |
| 6,394,791 | B2 | 5/2002 | Smith et al. |
| 6,662,564 | B2 | 12/2003 | Bruck et al. |
| 6,775,989 | B2 | 8/2004 | Bandaru et al. |
| 6,829,896 | B2 | 12/2004 | Bruck et al. |
| 2003/0056511 | A1 | 3/2003 | Bruck et al. |
| 2004/0050053 | A1 | 3/2004 | Bandaru et al. |

FOREIGN PATENT DOCUMENTS

| JP | 2001302203 | 10/2001 |
| JP | 2001302203 A | 10/2001 |
| WO | 2005068062 A1 | 7/2005 |
| WO | 2006032877 A1 | 3/2006 |

OTHER PUBLICATIONS

European Search Report for 07251530.7-2104/1844844.

* cited by examiner

*Primary Examiner* — Walter D Griffin
*Assistant Examiner* — Natasha Young
(74) *Attorney, Agent, or Firm* — Kinney & Lange, P.A.

(57) ABSTRACT

A method of combusting a catalyzed hydrocarbon fuel comprising providing a first fluid and a second fluid, at least one of said fluids comprising a mixture of a hydrocarbon fuel with an air stream, passing the first fluid into one or more catalytic tubes of a catalytic reactor, and passing the second fluid adjacent the catalytic tubes in a chamber of a catalytic reactor. A varying tube cross section to modify the flow of one of the fluids is provided for at least a portion of the tube. The flow of the first fluid leaving the catalytic tubes is mixed with the second fluid and combusted.

7 Claims, 5 Drawing Sheets

METHOD OF CATALYTIC REACTION

CROSS-REFERENCE TO RELATED APPLICATION(S)

This application is a divisional application of U.S. patent application Ser. No. 11/401,075, filed on Apr. 10, 2006 and entitled CATALYTIC REACTOR WITH SWIRL.

BACKGROUND

The present invention is directed to a system and method for combusting hydrocarbon fuels in an efficient manner which minimizes pollutant emissions, particularly NOX emissions.

Exhaust gases produced in the combustion of hydrocarbon fuels by engines contribute to atmospheric pollution. Exhaust gases typically contain nitric oxide (NO), nitrogen dioxide ($NO_2$), carbon monoxide, and unburned hydrocarbons. Nitrogen oxides are a cause of smog, acid rain, and depletion of stratospheric ozone. With high combustion temperatures in an engine, oxygen and nitrogen combine to form the pollutants NO and $NO_2$ (collectively known as "$NO_X$"). Typical fuels reacting with air exceed the threshold temperature which results in $NO_X$ formation.

A reduction in the formation of $NO_X$ is desirable. One method to control $NO_X$ is to employ a catalyst that allows low-temperature reaction of fuel and air. Most, if not all, of the fuel can be reacted at a moderate temperature, thus inhibiting formation of $NO_X$. The use of a catalyst results in a pre-reaction of a portion of a fuel to stabilize the main combustion process. The catalytic process is referred to as catalytic combustion.

When reacting fuel with a catalyst, heat is generated. This heat must be controlled to result in a lower combustion temperature. Typically only a portion of the total fuel to be burned is reacted in the catalyst chamber. One solution to the problem of heat production is to provide a stream of cooling air about a stream of fluid that is in contact with the catalyst or a substrate to which the catalyst is attached or resides. Such a process uses heat exchange in which certain channels contain the catalyzed fluid, while other channels contain air for cooling and absorbing heat from the catalytic reaction. These two fluid streams can then be mixed upon exiting the heat exchanger and combusted with a reduction of $NO_X$.

In catalytic combustors (or catalytic reactors), hydrocarbon fuel is mixed with a first air stream to form a fuel and air mixture having an equivalence ratio greater than unity, that is with fuel in excess, and partially oxidized by contacting the fuel/air fluid mixture with an oxidation catalyst stage, thereby generating the heat of reaction in a partial oxidation product stream comprising hydrogen, water, and carbon oxides. The reaction is intended to be pure catalytic, thus minimizing the formation of oxides of nitrogen ($NO_X$).

A portion of the heat of reaction is conducted through the wall of a substrate on which the catalyst resides and is removed via the back side convection and conduction heat transfer to the second air stream and/or compatible cooling fluid. The partial oxidation product stream is mixed with a second air stream, which is raised in temperature from its initial state via the heat of reaction, and subsequently combusted in a down stream combustor. The down stream combustor can include additional fuel or air mixtures that contribute to combustion in single or multiple zones.

The fuel/air mixture flows into a catalytic oxidation stage and contacts an oxidation catalyst which partially oxidizes the mixture to generate heat and a partial oxidation product stream comprising hydrogen, carbon oxides (primarily CO), and unreacted hydrocarbon fuel. Catalytic oxidation in this context is intended to drive a rapid oxidation or oxidative pyrolysis reaction carried out at a temperature below that required to support thermal combustion or combustion without a flame at a temperature below which thermal $NO_X$ will not form in appreciable amounts. Partial oxidation means that there is insufficient oxygen available to completely convert fuel to carbon dioxide and water, and thus fully liberate the chemical energy stored in the fuel. Since complete oxidation improves the energy potential of the fuel, any improvement in the catalytic reactor is beneficial.

A practical problem in the design of an integrated catalytic reactor—heat exchanger is balancing the rate of reaction and chemical heat release with the rate of heat exchanged to the adjacent cooling flow. If not well-balanced, sections of the reactor can over heat leading to premature failures or loss of activity. Such a situation often occurs at the leading edge of a reactor system. Reaction rates could be changed by altering the catalyst loading on the catalytic surface. Such a strategy is generally not acceptable, however, since system performance will be adversely affected as the catalyst degrades. It is better to design the hardware such that the rate limiting processes are based on geometry and fluid flow conditions, and hence controlled by transport processes rather than catalytic activity. This invention provides such a strategy.

SUMMARY

The current disclosure seeks to improve current catalytic reactor designs and methods of use thereof. A change in the cross-sectional area and shape of a catalytic tube or channel promotes turbulence in fluid flow passing through and around the catalytic tube. Altered turbulence levels will change the rate of heat and mass transfer and hence the effectiveness of the catalytic conversion and/or the rate of energy exchange between the adjacent passages. By varying the area/shape along the length of the reactor the design can be tailored or optimized depending on whether the catalytic reaction or the heat exchange is to be locally enhanced or suppressed as defined by performance criteria. The cross-sectional design is used in a catalytic reactor to allow for a method of improved combustion of a catalyzed fuel by either adding to the catalyst surface area, or changing the residence time of a fluid with the catalyst, or both, and promoting mixture and swirl of the catalyzed fluid with another fluid.

DETAILED DESCRIPTION

Figure 1:
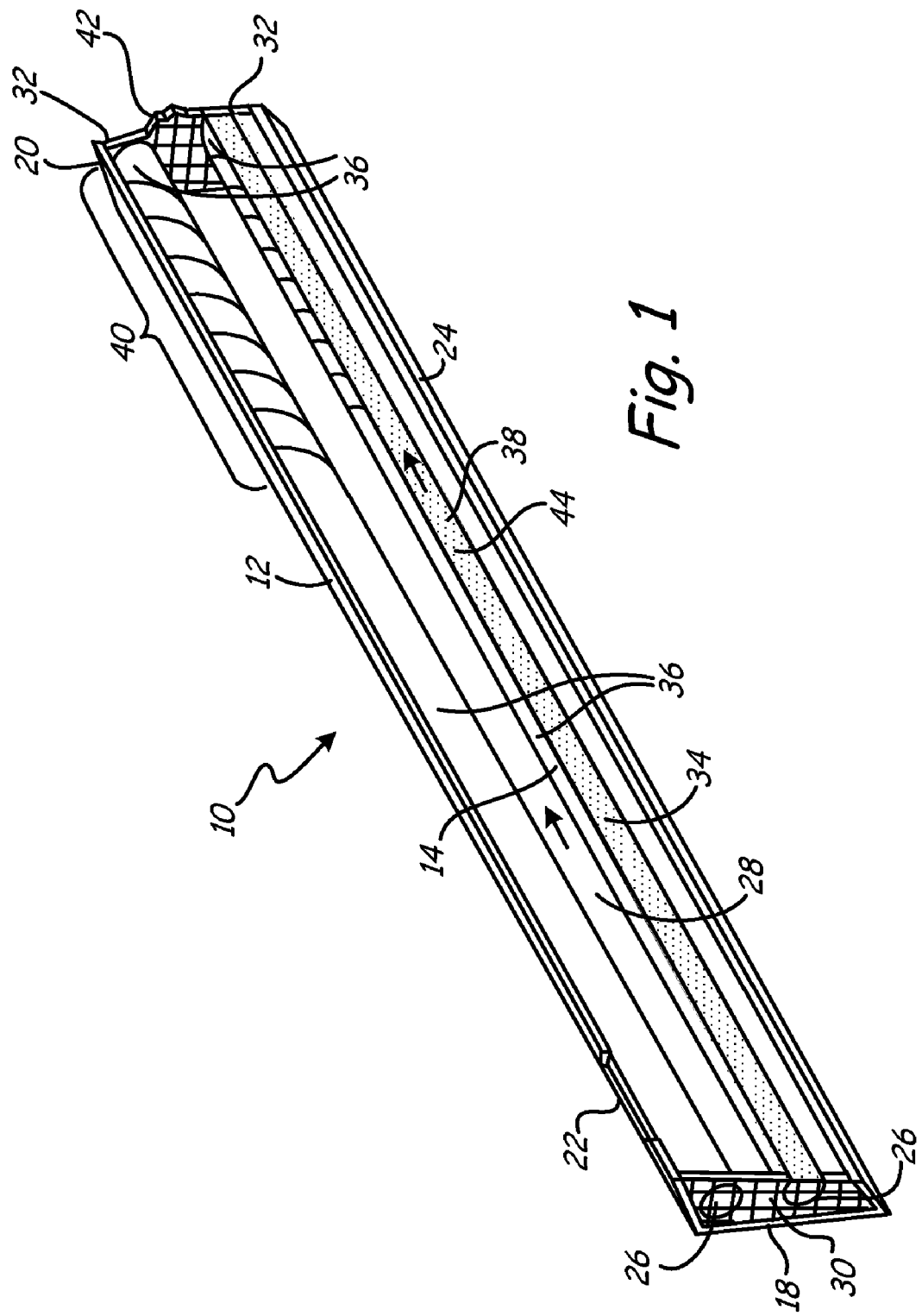
FIG. 1 depicts a longitudinal cross-section of a first embodiment of a catalytic reactor containing an insert within a catalyst tube.

FIG. 1 depicts a longitudinal cross-section of catalytic reactor 10, which includes housing 12 and catalyst tubes 14. Catalytic reactor 10 may be integrated with a gas turbine combustion system (not illustrated). In this embodiment, housing 12 contains an entrance 18 and an exit 20. Housing 12 contains at least one aperture 22 for introducing an additional fluid into housing 12. A wall 24 of housing 12 and exterior surface 36 of catalyst tubes 14 create a fluid flow path 28 from the entrance 18 or aperture 22 to the exit 20. Entrance 18 comprises a grate 30 connected to wall 24 of housing 12. Grate 24 secures catalyst tubes 14 in place within the housing 12, while allowing for the introduction of fluids into catalyst tubes 14 and flow path 28. Grate 30 and wall 24 of housing 12 are constructed from metal or other material system suited for the application. Exit 20 allows fluids flowing within flow path 28 to exit the housing 12.

Catalyst tubes 14 are made from a heat conducting material and adapted for conducting fluid flow internally and within the housing 12. Catalyst tubes 14 have a tube entrance 26, a tube exit 32, an interior surface 34, and an exterior surface 36. The interior surface 34 creates an interior flow path 38 within the catalyst tube 14. A portion 40 of catalyst tube 14 adjacent the tube exit 32 contains a differing cross section to change the flow direction and velocity of the fluid exiting the catalyst tube 14.

Flow paths 28 within housing 12 are defined by the tube exterior surfaces 36 and wall 24. Flow paths 28 are in communication with aperture 22 and exit 20. Flow paths 28 can have varying configurations dependent upon the shape and spacing of catalyst tubes 14 and wall 24 of housing 12. Flow paths 28 permit the flow and diffusion of a fluid in a manner to allow heat transfer with the fluids flowing within catalyst tubes 14. In one embodiment, flow paths 28 extend between the inlet aperture 22 and flow path exit 42, and prevent the fluid flowing there from contacting the fluid in the catalytic tubes 14. Flow path exit 42 is a grate similar to the grate 30 of entrance 18, although a variety of other entrance and exit designs are acceptable.

The result of a varied section of the tube is to produce swirl to increase turbulence and residence time as well as catalytic surface area per unit length within the catalyst tube, which results in more oxidation of a fluid comprised of fuel and air. Thus, the catalytic reaction per unit of length of catalyst tube 14 is increased. Also, the production of swirl results in a turbulated flow as the fluid exits the tubes. This aids in mixing the fluid exiting the tubes with a fluid exiting the flow paths 28 of the reactor 10 at exit 20, a fluid being introduced adjacent the exit 20, or both.

A catalyst 44 is deposited on a portion of the catalytic tube 14. In one embodiment, catalyst 44 can be deposited anywhere in the flow path 38 through tube 14. A fuel-rich fuel/air mixture is mixed prior to delivery to interior flow path 38 created by catalytic tube 14. Alternately, mixing of fuel and air within flow path 38 is possible due to the turbulence of fluid flow created by non-periodic varied portion of tube 14.

In an alternate embodiment, the catalyst 44 is deposited on the exterior surface 36 of catalytic tube 14, or on portions of both the interior flow path 38 and exterior surface 36.

When the fuel is a hydrocarbon or hydrocarbon oxygenate, and the oxidizer is oxygen or air or a combination thereof, catalyst 44 may include group VIII noble metals, base metals, metal oxides, or a combination thereof. Elements including zirconium, vanadium, chromium, manganese, copper, platinum, palladium, ruthenium, osmium, iridium, rhodium, cerium, lanthanum, other elements of the lanthanide series, cobalt, nickel, and iron are all suitable, as well as chromium oxides, cobalt oxides, and alumina, or mixtures thereof. Catalyst 44 is applied directly to the substrate, or in an alternate embodiment, is applied to a bonding coat or washcoat composed of such materials as alumina, silica, zirconia, titania, magnesia, yttrium, other refractory metal oxides, or a combination thereof.

The substrate comprising the catalytic tubes 14 is fabricated from high-temperature materials. In one embodiment, high temperature nickel alloy is used. In alternate embodiments, high-temperature metal alloys are used, including alloys composed of iron, nickel, and/or cobalt, in combination with aluminum, chromium, and/or other alloying materials. Other substrate materials include ceramics, metal oxides, intermetallic materials, carbides, and nitrides. Metallic substrates and refractories are most preferred due to their excellent thermal conductivity, allowing effective backside cooling of the catalyst.

In the embodiment of FIG. 1, a portion of interior surface 34 of catalytic tube 14 is coated with catalyst 44. In this embodiment, a first fluid comprising fuel/air mixture is introduced into catalytic tubes 14 at entrances 26. A second fluid, either air or additional fuel/air mixture, is introduced into catalytic reactor 10 at aperture 22, the second fluid absorbing the heat of the catalytic reaction to lower the temperature of the first fluid. The change in the cross sectional area 40 of tube 14 not only increases the residence time of the first fluid, but also acts to further the reaction of the first fluid.

Figure 2A:
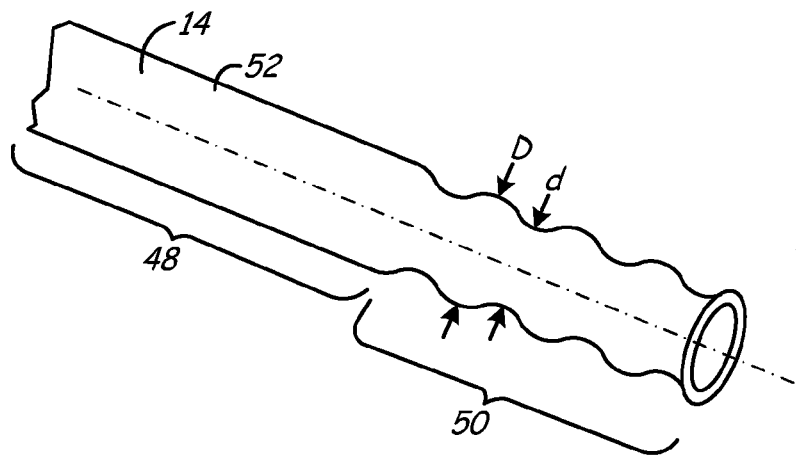
FIG. 2A shows a perspective view of a reactor tube containing a ribbed section.

FIGS. 2A-2E show perspective views of portions of catalytic reactor tubes 14 illustrating various fluid flow variation means. Illustrated in FIG. 2A is an embodiment of a reactor tube 14 containing a straight section 48 and a ribbed section 50. Straight section 48 is a section of standard round tubing containing a wall 50 which creates an internal flow path (such as 38 of FIG. 1). Ribbed section 52 contains an undulating profile which creates a series of ribs 54 containing maximum outer diameter D and minimum outer diameter d. Maximum outer diameter D is equal to or larger than the diameter of the straight section 48 of catalytic tube 14. Similarly, minimum outer diameter d is equal to or less than the diameter of straight section 48 of catalytic tube 14. The ribs result in an expanding and contracting of the internal flow path, such as 38 of FIG. 1, of the tube which affects the flow of a fluid passing through the tube 14. Portions of either the interior or exterior of the tube 14 may contain catalyst 44 (FIG. 1).

Figure 2B:
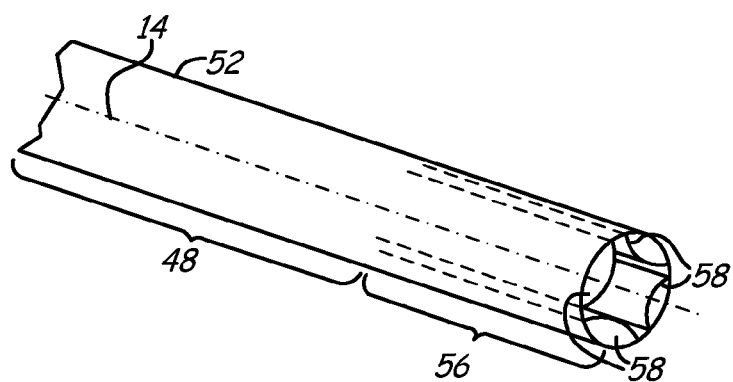
FIG. 2B is a perspective view of a reactor tube containing an internally fluted section.

Illustrated in FIG. 2B is an embodiment of a reactor tube 14 containing straight section 48 and fluted section 56. Straight section 48 is again a section of standard round tubing containing a wall 52 which creates an internal flow path such as 38 of FIG. 1. Fluted section 56 contains four internal ribs 58 to change the cross-sectional area of tube 14. In alternate embodiments, the number of internal ribs varies as required for design. The internal ribs 58 are illustrated as generally parallel to the central axis of tube 14, but in alternate embodiments, the ribs may be helically wound about the interior of tube 14. In an embodiment where catalyst 44 is present on the interior of tube 14, the catalyst 44 may be placed on the entire inner surface of tube 14, on only either the straight section or the fluted section, portions of both, or only on the ribs 58 or the internal surface excluding the ribs 58.

Figure 2C:
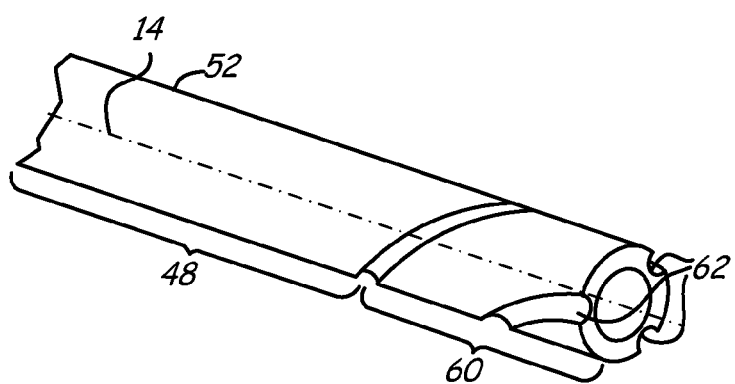
FIG. 2C illustrates a perspective view of a reactor tube containing an externally fluted section.

Illustrated in FIG. 2C is an embodiment of a reactor tube 14 containing straight section 48 and externally fluted section 60. Straight section 48 is again a section of standard round tubing containing a wall 52 which creates an internal flow path such as 38 of FIG. 1. Fluted section 60 contains three external flutes or channels 62 to change the cross-sectional area of tube 14. In alternate embodiments, the number of channels varies as required for design. The channels 62 are illustrated helically wound about central axis of tube 14, but may be generally parallel to the central axis in an alternate embodiment. In an embodiment where catalyst 44 is present on the exterior of tube 14, the catalyst 44 may be placed on the entire exterior surface of tube 14, on only either the straight section 48 or the fluted section 60, portions of both, or only on channels 62 or exterior surface excluding channels 62.

Figure 2D:
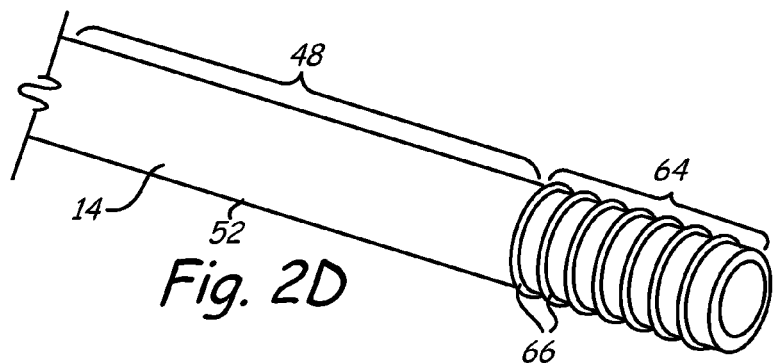
FIG. 2D is a perspective view of a reactor tube containing an externally finned section.

Illustrated in FIG. 2D is an embodiment of a reactor tube 14 containing a straight section 48 and externally finned section 64. Straight section 48 is a section of standard round tubing containing a wall 52 which creates an internal flow path such as 38 of FIG. 1. Fins 66 are present on the outer surface of the tube 14. Fins 66 are illustrated as being perpendicular to the central axis of tube 14. In alternate embodiments, fins 66 are parallel to central axis, or helically spaced around tube 14. Fins 66 are of a constant height, but in alternate embodiments, fins 66 can be of varying heights. Fins 66 may also contain apertures to permit airflow through a portion of the fin (not illustrated). In an embodiment where catalyst 44 is present on the exterior of tube 14, the catalyst 44 may be placed on the entire exterior surface of tube 14, on only either the straight section 48 or the finned section 64, portions of both, or only on fins 66 or the exterior surface of the tube excluding fins 66.

Figure 2E:
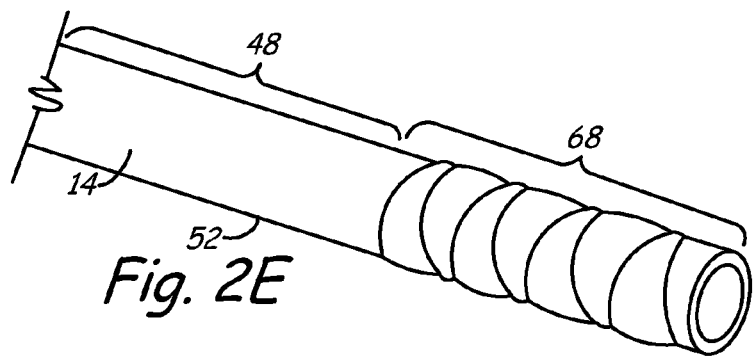
FIG. 2E is a perspective view of a reactor tube containing a twisted section.

Illustrated in FIG. 2E is an embodiment of a reactor tube 14 containing a straight section 48 and a twisted section 68. Straight section 48 is a section of standard round tubing containing a wall 52 which creates an internal flow path (such as 38 of FIG. 1). Twisted section 68 contains an undulating profile from a dual twist of a portion of the tube: one twist clockwise and a second twist counterclockwise about the central axis of tube 14. The result is an expanding and contracting of wall 52 of tube 14 which affects the flow of a fluid passing either through the interior or adjacent the exterior of tube 14. Portions of either the interior or exterior of tube 14 may contain catalyst 44.

Figure 3A:
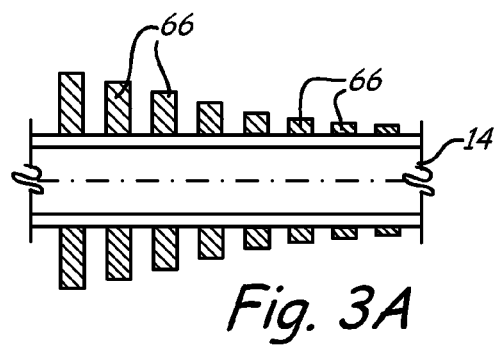
FIG. 3A is a cross-sectional view of a reactor tube containing a gradient of external fins.
Figure 3B:
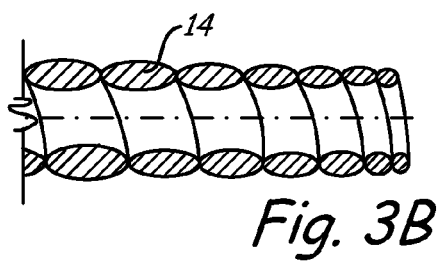
FIG. 3B is a cross-sectional view of a reactor tube containing a change in twist pitch.
Figure 3C:
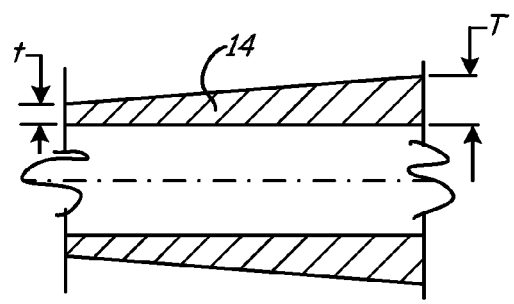
FIG. 3C is a cross-sectional view of a reactor tube containing a changing wall thickness.

FIGS. 3A-3C are cross-sectional views of reactor tube which also contain means for varying fluid flow. Illustrated in FIG. 3A is an embodiment of a reactor tube 14 containing longitudinally varying fins 66 of FIG. 2D. As illustrated, the fins 66 change in height along the length of the tube 14. Interior flow path 38 is uniform throughout the length of tube 14. Fluid flow passing adjacent tube 14 will be impeded by fins 66 which decrease is size. Catalyst 44 may be applied to fins 66. When this embodiment is used adjacent inlet aperture 22, the flow adjacent tube 14 is slowed upon entering the catalytic reactor for maximum heat transfer, and the rate of heat transfer is decreased as the fluid travels through tube 14. Fins 66 may be used alone, or in combination with the earlier described embodiments.

Illustrated in FIG. 3B is an embodiment of reactor tube 14 containing a change in pitch of twisted section 68. The embodiment is similar to those discussed in FIG. 1 and FIG. 2E, but twisted section 68 contains a nonuniform pitch per unit length. The increased pitch of the twists aid in impeding fluid flow, which changes the rate of transfer of heat through the tube as well as changing the velocity of fluids passing through and adjacent the exterior of tube 14.

Illustrated in FIG. 3C is an embodiment of reactor tube 14 containing a changing wall thickness. Wall thickness varies from minimum thickness t to maximum thickness T. As illustrated, tube 14 contains a uniform interior diameter. In an alternate embodiment, the exterior diameter remains constant and the interior diameter is decreased. Catalyst 44 can be applied to either the exterior or interior surface of tube 14.

Figure 4:
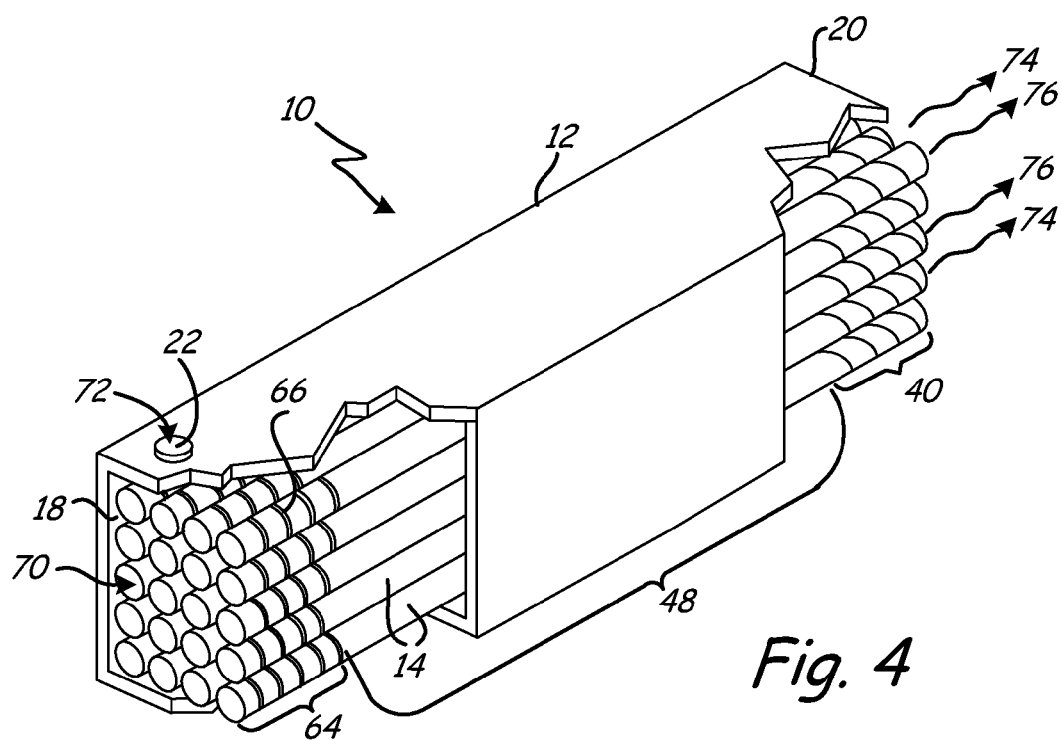
FIG. 4 is a perspective view of a catalytic reactor with a portion of the housing removed.

FIG. 4 is a perspective view of a catalytic reactor 10 with a portion of the housing 12 removed. Catalytic reactor 10 is a structure comprised housing 12 and catalytic tubes 14. In the embodiment shown in FIG. 4, catalytic reactor 10 is generally constructed to contain a square-packed arrangement of parallel, equal-length, cylindrically-shaped catalytic tubes 14 within housing 12. Tubes 14 comprise twisted portions 40 adjacent exit 20, straight portion 48, and finned portions 64 adjacent entrance 18. Although illustrated as a parallelopiped, other geometries for housing 12 are envisioned including cylindrical, polygonal prisms, toroidal, L-shaped, conical geometries or combinations thereof. Moreover, catalytic tubes may be of any of the embodiments disclosed herein and need not comprise a straight 48 or finned entrance section as depicted in embodiments detailed herein.

The impact of swirl to enhance mixing can be simulated at the exit of the reactor by creating fluid dynamic strain where the two exit streams mix. The reacting flow in the tube and corresponding cooling air flow stream may exit with the same flow orientation (e.g. swirl) about a given tube. Alternatively, the reacted fuel/air mixture may exit straight through the exit while the cooling air flow on either side of the fuel/air passage alternate direction. The opposite configuration may be used also.

Referring to FIG. 4, a first fluid of fuel/air mixture enters the catalytic tubes 14 at or near entrance 18 as represented by arrow 70. Simultaneously, a second fluid comprising ambient air is introduced into the flow paths between adjacent catalytic tubes 14 through inlet aperture 22 as represented by arrow 72. Although only a single inlet aperture 22 is visible in FIG. 4, it is envisioned that there may be a plurality of inlet apertures located adjacent entrance 18. In an alternate embodiment, the second fluid is similar in composition to the first fluid and contains a fuel/air mixture. The interior surface of catalytic tubes 14 contain a catalyst which reacts with the first fluid and generates heat. The second fluid acts a cooling fluid and absorbs the heat generated by the reaction. The flow 72 adjacent the exterior of tubes 14 is slowed upon entering the catalytic reactor by the presence of fins 66 of finned section 64. The fins 66 thus act to adjust the rate of heat transfer near the entrance by keeping the second fluid 72 in contact with the first portion of the reactor tube 14. This results in a more uniform temperature gradient through the catalytic reactor 10, thus extending its useful life.

The fluids 70, 72 leave the catalytic reactor 10 at exit 20. Due to the presence of the twisted portion 40 of catalytic tubes 14, the first fluid exits tubes 14 in an agitated flow pattern as represented by arrows 74. The second fluid is also leaving exit 20 as turbulent flow also as represented by arrows 76. The fluids 74, 76 mix upon leaving exit 20. The agitation of fluid flow created by the twisted portion 40 aids in the mixing of the first and second fluids at exit 20 to create a single heated, and partially reacted, third fluid for combustion.

In the embodiment illustrated FIG. 4, catalytic tubes 14, including twisted portions 40, are cylindrical and concentric with a respective conduit centerline. In alternate embodiments, other cross-sectional geometries of the catalytic tubes 14 are envisioned, including ellipses, polygons, or combinations thereof for both the main portion and twisted portion 40 of the catalytic tubes 14.

Figures 5A, 5B:
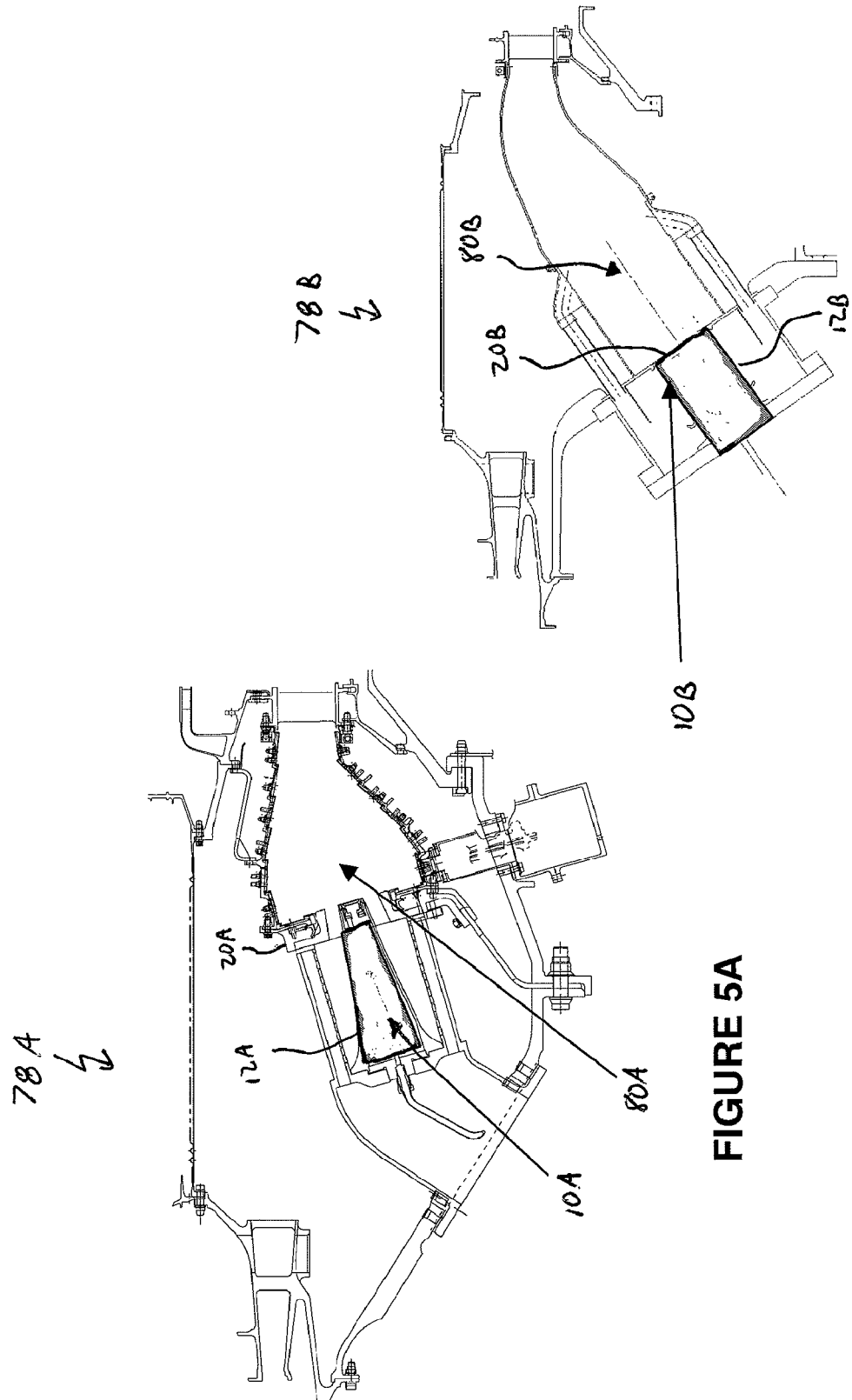
FIG. 5A is a cross-sectional view of a turbine engine containing a catalytic reactor and combustion chamber.
FIG. 5B is a cross-sectional view of a second turbine engine containing a catalytic reactor and combustion chamber.

FIGS. 5A and 5B show differing embodiments of catalytic reactors 10A and 10B. FIG. 5A depicts a cross-sectional view of a portion of turbine engine 78A with catalytic reactor 10A and combustion chamber 80A. In this embodiment, catalytic reactor is a trapezoid in cross section. Catalytic reactor 10A contains housing 12A, which may be a trapezoidal prism or frustum. Reactor 10A contains catalytic tubes (not illustrated), and decreases in cross-sectional area near 20A. This configuration of the reactor housing 12A aids in modifying fluid flow near the exit to promote a desired mixing as the fluid leaves reactor 10A and enters combust chamber 80A. Additionally, the catalytic tubes contain any of the disclosed means for varying a property of the fluid passing therein or adjacent thereto.

FIG. 5B depicts a cross-sectional view of a portion of turbine engine 78B with catalytic reactor 10B and combustion chamber 80B. In this embodiment, catalytic reactor 10B is rectangular in cross section, and contains housing 12B, which may form a polygonal prism or cylinder. In this embodiment, catalytic reactor 10B contains catalytic tubes (not illustrated). The tubes contain any of the disclosed means for varying a property of the fluid passing therein or adjacent thereto, which aids in the mixing of the fluid leaving exit 14B of catalytic reactor 10B.

A catalytic reactor of any of the disclosed embodiments is designed for maximum catalytic reaction in normal operating conditions, while minimizing variations in chemical reaction rates and mass transfer rates due to fluid flow fluctuations. Catalysts are applied in coatings on a weight basis in relationship to geometric surface area of catalyst. Insufficient coating area will result in an insufficient catalytic reaction for the desired reactor and combustor design due to insufficient total mass transfer from the fluid to the catalytic surface. The required coating area depends upon operating conditions (e.g. reactant temperature, pressure, velocity, composition) and catalyst activity, and can be determined by methods known in chemical engineering practice.

With the presence of the fluid variation means of the catalytic tubes of a catalytic reactor, fluid flow will be slowed, adjusted, or disturbed in a controlled fashion, thus allowing for greater residence time with the coating area containing the catalyst. This produces a decrease of the required surface area of the catalyst, which results in smaller and less expensive reactors. Thus, design of a reactor will balance the surface area for reaction and cooling with the desired volumetric flow rates of the relevant fluids passing through the reactor. Also, the change in fluid flow is desirable for promoting the mixing of fluids on the reacting (catalyst coated) side and cooling side. The enhanced mixing of fluids will shorten the required mixing length prior to the main combustor, and also shorten the mixing time, which are important in some applications to prevent premature ignition. Premature ignition in the post-reactor mixing zone will result in excess NOx production and increased chance of hardware failure.

The catalytic reactor of the current invention is used for combusting a catalyzed hydrocarbon fuel. A first fluid is passed into catalytic tubes of the catalytic reactor, while a second fluid is passed adjacent the catalytic tubes in the flow paths of the chamber of the catalytic reactor. Both the first fluid and the second fluid can be comprised of air/fuel mixture, or an air stream. At least one of the fluids is comprised of air/fuel mixture and is in contact with a catalyst. The other fluid can be comprised of air/fuel mixture or a different gas or gas mixture such as air. The fluid variation means is provided for at least a portion of the tube to modify the flow of the first fluid, and/or add to the catalytic reaction. The flow of the first fluid leaving the catalytic tubes is mixed with the second fluid, and this mixture is combusted. The heat of the catalytic reaction is extracted from fluid in contact with the catalyst and transferred to the other fluid. In one embodiment, the second fluid is controllably introduced into the catalytic reactor. A third fluid, such as additional air or additional air/fuel mixture, can be added to the mixture of the first fluid and the second fluid upon exiting the reactor to achieve a desired equivalence ratio for combustion.

Although illustrated in FIG. 1 as containing a catalyst on the substantial portion of catalytic tube 14, the catalytic reactor may be designed so that the catalyst is only present on a portion of the catalytic tube. Thus, it is envisioned that a reactor may be designed containing any length and geometry of catalytic tube covered with any length with catalyst, and containing a fluid variation means along any portion the catalytic tube. For example, the catalytic tube may contain catalyst in the last two-thirds of the catalytic tube, or its first two-thirds, while a fluid variation means is placed within the tube that has an effective length of the last one-third of the tube. The fluid variation means slows the flow of a fluid in the catalytic tube for the last portion of the tube, and creates a turbulence which allows for better mixing upon exiting of the tube.

Application of the catalytic tubes containing the fluid variation means enables reduction of the wall temperature at the entrance by modifying the geometry near the front of the reactor. The variations in the tube increase the available surface area for heat transfer and/or decrease the initial fluid velocity of the reacting side to reduce temperatures in the system. However, it is not preferable to maintain the variation means throughout the catalytic tube length as the variation in geometry will result in a prohibitive pressure drop in the fluid flow. In one embodiment, the tube is designed to contain a geometric design that promotes higher velocities on the reacting side with lower surface areas on the cooling air side to maintain reactivity and minimize pressure loss. For example, the transition may be approximately 20% from the entrance or the exit of the reactor, but may occur anywhere from 5% to 90% along the length depending on the geometric features utilized.

Placing fluid variation means into a portion of the catalytic tubes of the catalytic reactor results in increased surface area per unit length for oxidizing the fuel/air mixture internal to the conduits where the catalyst is applied. The result is a tortuous flow path internal to the conduits or adjacent the tube exterior, which produces swirl within the conduits or housing to increase residence time for oxidizing the fuel/air mixture. The shape of a conduit can be designed to promote swirl and shear mixing at the exit of the catalytic tube or conduit. Alternately, the fluid variation means can be at another portion of the tube, such as near the entrance or central portion to provide turbulence in the fluid flow to increase reaction time within the reactor and create a more uniform temperature gradient along the tube length. Overall, the embodiments disclosed herein can be utilized to design a catalytic reactor with tubes designed to optimize the velocity, heat transfer, and mixing of the fluids to obtain a reactor of a specified size and geometry.

With the turbulated flow pattern, the product stream and secondary air streams mix rapidly upon leaving the catalytic reactor and effectively combine to allow combustion of fuel mixture. This reduces emissions from levels currently present in the state of the art, and the potential to remove the size of this secondary region for combustion and the required complexity therein. Overall, adding fluid variation means which increase residence time, i.e. the time the fluid is in the catalytic tube, resulting in greater reaction per unit length. This will allow for the reduction of the size of equipment and the complexity of combustor assemblies.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of combusting a catalyzed hydrocarbon fuel, the method comprising:
   providing a plurality of fluids, at least one of said fluids comprising a mixture of a hydrocarbon fuel with an air stream;
   passing the mixture into a plurality of catalytic tubes of a catalytic reactor;
   passing the remainder of the plurality of fluids excluding the mixture adjacent the catalytic tubes in a chamber of a catalytic reactor;
   providing, for at least a portion of each of the plurality of tube, a varying tube cross section to modify the flow of one of the fluids;
   mixing the flow of the plurality of fluids leaving the catalytic tubes;
   combusting a second mixture consisting essentially of the plurality of fluids leaving the catalytic tubes.

2. The method of claim 1 further comprising:
   extracting a portion of the heat of a catalytic reaction of one of the plurality of fluids;
   and
   transferring the heat to the remaining plurality of fluids.

3. The method of claim 1 further comprising:
   adding a fluid to the second mixture.

4. The method of claim 1 further comprising:
   controllably introducing the plurality of fluids into the catalytic reactor.

5. The method of claim 1 wherein the varying tube cross section is adjacent an exit of the catalytic reactor.

6. The method of claim 1 wherein the plurality of tubes contain a catalyst on the varying tube section of each respective tube.

7. The method of claim 1 wherein the plurality of tubes contain a catalyst on a non-varying tube cross section of each respective tube.

* * * * *